(12) United States Patent
Cho et al.

(10) Patent No.: US 9,305,349 B2
(45) Date of Patent: Apr. 5, 2016

(54) APPARATUS AND METHOD FOR DETECTING LESION

(71) Applicant: Samsung Electronics Co., Ltd., Suwon-si (KR)

(72) Inventors: Baek-Hwan Cho, Seoul (KR); Yeong-Kyeong Seong, Yongin-si (KR); Ye-Hoon Kim, Seoul (KR); Jung-Hoe Kim, Seongnam-si (KR); Moon-Ho Park, Hwaseong-si (KR); Sin-Sang Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/308,469

(22) Filed: Jun. 18, 2014

(65) Prior Publication Data

US 2015/0003677 A1   Jan. 1, 2015

(30) Foreign Application Priority Data

Jun. 28, 2013   (KR) .......................... 10-2013-0075917

(51) Int. Cl.
*G06K 9/00*   (2006.01)
*G06T 7/00*   (2006.01)

(52) U.S. Cl.
CPC ..... *G06T 7/0012* (2013.01); *G06T 2207/10072* (2013.01); *G06T 2207/10116* (2013.01); *G06T 2207/10132* (2013.01); *G06T 2207/20081* (2013.01); *G06T 2207/30096* (2013.01)

(58) Field of Classification Search
USPC .................................................. 382/128, 159
See application file for complete search history.

(56) References Cited

U.S. PATENT DOCUMENTS

| | | | |
|---|---|---|---|
| 8,311,962 B2 | 11/2012 | Kato et al. | |
| 2004/0101181 A1* | 5/2004 | Giger et al. | .................... 382/128 |
| 2005/0049497 A1* | 3/2005 | Krishnan et al. | .............. 600/437 |
| 2005/0169517 A1* | 8/2005 | Kasai | ............................ 382/159 |
| 2005/0213841 A1 | 9/2005 | Linguraru et al. | |
| 2006/0120575 A1 | 6/2006 | Ahn et al. | |
| 2007/0014457 A1 | 1/2007 | Jolly et al. | |

(Continued)

FOREIGN PATENT DOCUMENTS

| | | |
|---|---|---|
| EP | 2 377 097 A | 10/2011 |
| JP | 2010-79398 A | 4/2010 |

(Continued)

OTHER PUBLICATIONS

Chan, Tony F., et al. Vese. "Active contours without edges." Image processing, IEEE transactions on 10.2 (2001):266-277.

(Continued)

*Primary Examiner* — John Strege
(74) *Attorney, Agent, or Firm* — NSIP Law (57) ABSTRACT

An apparatus and method for detecting a lesion, which enables to adaptively determine a parameter value of a lesion detection process using a feature value extracted from a received medical image and a parameter prediction model to improve accuracy in lesion detection and lesion diagnosis. The apparatus and the method include a model generator configured to generate a parameter prediction model based on pre-collected medical images, an extractor configured to extract a feature value from a received medical image, and a determiner configured to determine a parameter value of a lesion detection process using the extracted feature value and the parameter prediction model.

20 Claims, 5 Drawing Sheets

(56) References Cited

U.S. PATENT DOCUMENTS

| | | | |
|---|---|---|---|
| 2007/0223807 A1* | 9/2007 | Yankelevitz et al. | 382/159 |
| 2009/0214090 A1 | 8/2009 | Hayes | |
| 2009/0273610 A1* | 11/2009 | Busch | G06T 7/0012 345/619 |
| 2010/0158332 A1* | 6/2010 | Rico et al. | 382/128 |
| 2011/0026798 A1* | 2/2011 | Madabhushi | G01R 33/56 382/131 |
| 2011/0229004 A1 | 9/2011 | Buelow et al. | |
| 2012/0008838 A1* | 1/2012 | Guyon et al. | 382/128 |
| 2012/0134544 A1 | 5/2012 | Long et al. | |

FOREIGN PATENT DOCUMENTS

| | | |
|---|---|---|
| JP | 2012-511337 A | 5/2012 |
| KR | 10-2006-0124964 A | 12/2006 |
| KR | 10-1126224 B1 | 6/2012 |
| WO | WO 2010/067219 A1 | 6/2010 |

OTHER PUBLICATIONS

Xiao, Guofang, et al. "Segmentation of ultrasound B-mode images with intensity inhomogeneity correction." Medical Imaging, IEEE Transactions on 21.1 (2002):48-57.

Boykov, Yuri, et al. "An experimental comparison of min-cut/max-flow algorithms for energy minimization in vision." Pattern Analysis and Machine Intelligence, IEEE Transctions on 26.9 (2004): (12 pages).

Sahiner, Berkman, et al. "Computerized characterization of breast masses on three-dimensional ultrasound volumes." Medical physics 31.4 (2004): (12 pages).

Huang, Yu-Len, et al. "Automatic contouring for breast tumors in 2-D sonography." Engineering in Medicine and Biology Society, 2005. IEEE-EMBS 2005. 27th Annual International Conference of the. IEEE, 2006: (4 pages).

Huang, Yu-Len, et al. "Level set contouring for breast tumor in sonography." Journal of digital imaging 20.3 (2007): 238-247.

Lee, Hye-Jeong, et al. "Observer variability of Breast Imaging Reporting and Data System (BI-RADS) for breast ultrasound." European journal of radiology 65.2 (2008): 293-298.

Kohli, Pushmeet, et al. "Robust higher order potentials for enforcing label consistency." International Journal of Computer Vision 82.3 (2009): (8 pages).

Liu, Xiaoming, et al. "A benign and malignant mass classification algorithm based on an improved level set segmentation and texture feature analysis." *Bioinformatics and Biomedical Engineering (iCBBE), 2010 4th International Conference on.* IEEE, 2010 (4 pages).

Cheng, H. D., et al. "Automated breast cancer detection and classification using ultrasound images: A survey," Pattern Recognition 43.1 (2010):299-317.

Shin, Hee Jung, et al. "Automated ultrasound of the breast for diagnosis: interobserver agreement on lesion detection and characterization." American Journal of Reoentgenology 197.3 (2011):747-754.

Hao, Zhihui, et al. "Combining CRF and multi-hypothesis detection for accurate lesion segmentation in breast sonograms." Medical Image Computing and Computer-Assisted Intervention—MICCAI 2012. Springer Berlin Heidelberg, 2012: (8 pages).

* cited by examiner

APPARATUS AND METHOD FOR DETECTING LESION

CROSS-REFERENCE TO RELATED APPLICATION(S)

This application claims the benefit under 35 U.S.C. §119(a) of Korean Patent Application No. 10-2013-0075917, filed on Jun. 28, 2013, in the Korean Intellectual Property Office, the entire disclosure of which is incorporated herein by reference for all purposes.

BACKGROUND

1. Field

The following description relates to an apparatus and method to detect a lesion in a medical image.

2. Description of the Related Art

In the modern medical industry, the use of medical images is indispensable for efficient diagnosis and treatment of a disease. In addition, due to recent advanced development of imaging techniques, it is possible to obtain more accurate and sophisticated medical images.

Less error may occur if a computer is used to diagnose a disease using medical images. Thus, a Computer Aided Diagnosis (CAD) technique is frequently used.

In a CAD system, it is a lesion's morphology, texture, and luminance that play a role in determining whether the lesion is malignant. Thus, lesion detection is an important technique for accurate lesion diagnosis.

Recently, numerous techniques to automatically detect a lesion using a computer have been developed. For example, a graph cut is a technique to detect a lesion by labelling each pixel or small-size region (known as superpixel) of an image.

In addition, an active contour model and a level set method have been used to detect a contour of a lesion.

In such lesion detection methods, a lesion is detected by segmenting the lesion and determining a contour thereof where an energy function has a minimal solution. That is, a value of each parameter in the energy function needs to be optimized.

Generally, in the lesion detection methods, a user selects a proper value for each parameter heuristically or based on domain knowledge, and uses the proper value as a fixed value.

However, accurate lesion detection is challenging in the case of an ultrasound mammogram image and any other image of which qualities vary according to an image capturing device, expertise of a doctor, a breast density, an intensity of an ultrasound transducer, and a surrounding environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative configuration, there is provided an apparatus to detect a lesion, including a model generator configured to generate a parameter prediction model based on pre-collected medical images; an extractor configured to extract a feature value from a received medical image; and a determiner configured to determine a parameter value of a lesion detection process using the extracted feature value and the parameter prediction model.

The extractor may be further configured to extract at least one of a global feature value, a local feature value, and a meta feature value.

The model generator may be further configured to generate the parameter prediction model using, as training data, a feature value extracted from each of the pre-collected medical images and a parameter value optimized for each of the pre-collected medical images.

The lesion detection process may employ an energy function.

The lesion detection process may be a level set process.

The apparatus may also include a detector configured to detect a lesion from the received medical image using the lesion detection process applied with the determined parameter value.

In response to a plurality of parameters of the lesion detection process, the model generator may be further configured to generate a parameter prediction model.

In accordance with another illustrative configuration, there is provided a method for detecting a lesion, including: generating, at a generator, a parameter prediction model from pre-collected medical images; extracting, at an extractor, a feature value from a received medical image; and determining, at a determiner, parameter values of a lesion detection process using the extracted feature value and the parameter prediction model.

The extracting of the feature value may include extracting at least one of a global feature value, a local feature value, and a meta feature value.

The generating of the parameter prediction model may include generating the parameter prediction model using training data including a feature value extracted from each of the pre-collected medical images and a parameter value optimized for each of the pre-collected medical images.

The lesion detection process may employ an energy function.

The lesion detection process may be a level set process.

The method may also include detecting a lesion in the received medical image using the lesion detection process applied with the determined parameter value.

The generating of the parameter prediction model may include, in response to parameters of the lesion detection process, generating a parameter prediction model.

In accordance with an illustrative configuration, there is provided an apparatus, including a feature value extractor configured to extract a feature value from a medical image; a model generator configured to generate a parameter prediction model using pre-collected medical images; a parameter value determiner configured to determine a parameter value by defining a contour of a lesion region in the medical image as an energy function, and detecting a lesion by finding out the contour where the energy function has a minimum value using the feature value and the parameter prediction model; and a lesion detector configured to detect a lesion in the medical image using the parameter value.

The feature value extractor extracts at least one of a global feature value, a local feature value, and a meta feature value with respect to a medical image.

The global feature value may include a feature value reflecting an entire region of the medical image, the local feature value may include a feature value reflecting a specific region of the medical image, and the meta feature value may include a feature value in which the global feature value and the local feature value are combined.

The model generator may be configured to generate the parameter prediction model using training data that includes a feature value extracted for pre-collected medical images and a parameter value optimized for each of the pre-collected medical images.

The lesion detector may define the contour of the medical image where the energy function has a value of or is closest to zero.

The apparatus may also include a medical image receiver configured to receive the medical image.

Other features and aspects may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
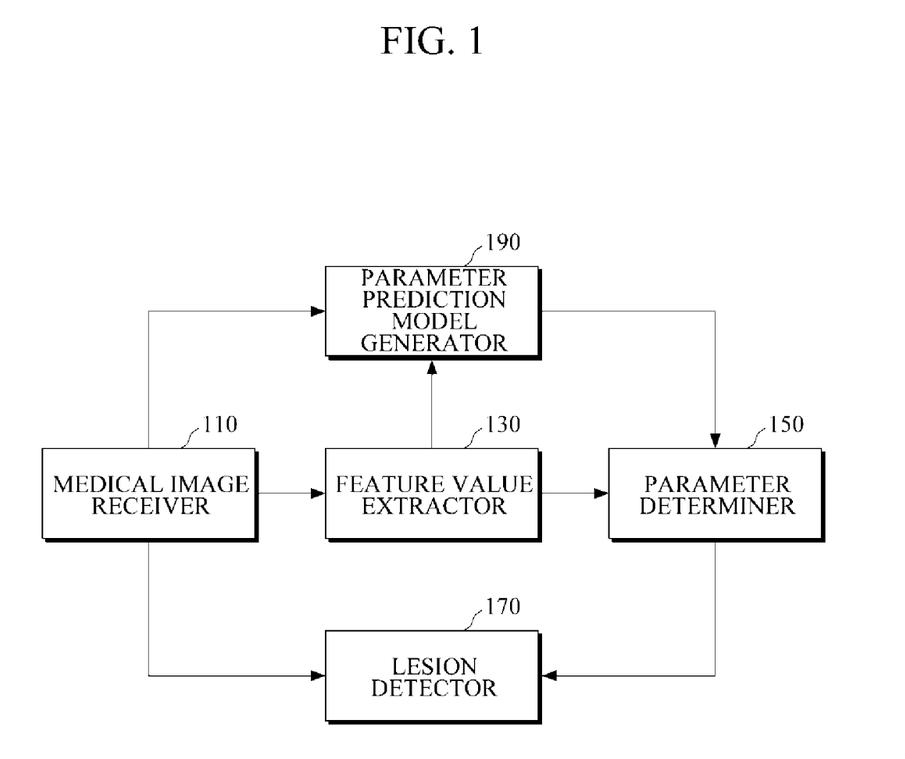
FIG. 1 is a configuration diagram illustrating an apparatus to detect a lesion, according to an embodiment.

FIG. 1 is a configuration diagram illustrating an apparatus to detect a lesion, according to an embodiment.

Referring to FIG. 1, the apparatus to detect the lesion includes one or more of the following hardware devices, a medical image receiver 110, a feature value extractor 130, a parameter value determiner 150, a lesion detector 170, and a parameter prediction model generator 190.

The medical image receiver 110 receives a medical image for lesion detection. The medical image may be a Positron Emission Tomography (PET) image, a mammogram image, a Computed Radiography (CT) image, an ultrasound image, a Magnetic Resonance Image (MRI) image, and any other medical image to be used for lesion diagnosis.

The feature value extractor 130 extracts a feature value from the medical image received by the medical image receiver 110.

A feature value is a numerical value indicating the medical image's brightness, color, contrast, texture, a morphological characteristic of a specific region (e.g., a shape of a boundary, a diameter and a length), or correlation between the specific region and surrounding region thereof.

In one embodiment, the feature value extractor 130 extracts at least one of a global feature value, a local feature value, and a meta feature value with respect to the medical image.

The global feature value refers to a feature value reflecting or defining the entire region of the medical image.

In addition, the local feature value refers to a feature value reflecting or defining a specific region of the medical image, and the meta feature value indicates a feature value in which the global feature value and the local feature value are combined or taken into consideration.

Furthermore, the specific region is an appropriate location of a lesion or an anatomically/pathologically significant marker. A specific region may be manually selected by a user in a medical image or may be automatically selected by the computer. For example, a specific region may be an initial lesion region selected in a received medical image.

The parameter value determiner 150 determines a parameter value of a lesion detection process using the feature value extracted from the medical image.

The lesion detection process uses the feature value to define a contour feature of a lesion region in the medical image as an energy function, and aims to detect a lesion by finding out a contour where an energy function has a minimum value. The lesion detection process may be any one of various processes that employs an energy function, such as a level set method and an active contour model.

In one embodiment, the lesion detection process may employ an energy function shown in Equation 1.

$$F = \alpha \times I_{local\_region} + I_{global\_region}(\text{radius}) + \beta \times C_{curvature} + \gamma \times C_{gradient} \quad [\text{Equation 1}]$$

In Equation 1, $I_{global\_region}$ denotes entropy of an entire region of a medical image, $I_{local\_region}$ denotes entropy of a specific region of the medical image, $C_{curvature}$ denotes a curvature of the specific region, and $C_{gradient}$ denotes energy variation of the specific region.

In one example, the entropy refers to a degree of how many pixels belonging to different classes are combined or mixed up. That is, the more pixels belonging to different classes are mixed up, the greater the entropy becomes. In addition, the specific region may indicate an appropriate location of a lesion or anatomically/pathologically significant marker, and may be a region selected by a user or automatically selected from the medical image.

Furthermore, in Equation 1, each of $\alpha$, radius, and $\beta$ indicates a parameter value that adjusts a weighted value of each field.

Specifically, $\alpha$ is an energy coefficient of the entire region of a medical image, radius is a range of a specific region of the medical image, $\beta$ is a curvature of the specific region, and $\gamma$ is an energy variation coefficient of the specific region.

The energy function shown in Equation 1 is merely an example, and other various energy functions may be defined and used.

Referring back to FIG. 1, the parameter prediction model generator 190 generates a parameter prediction model using training data that includes a feature value extracted from pre-collected medical images and a parameter value optimized for each of the pre-collected medical images. The parameter prediction model generator 190 stores the generated parameter prediction model.

In one embodiment, in response to a plurality of lesion detection processes, the parameter prediction model generator 190 generates one or more parameter prediction models. The parameter value determiner 150 determines at least one parameter value of the lesion detection process using the feature value extracted by the feature value extractor 130 and the parameter prediction model generated by the parameter prediction model generator 190.

Detailed descriptions about how to generate a parameter prediction model and how to determine a parameter value will be provided in the following.

The lesion detector 170 detects a lesion in the medical image by applying the parameter value determined by the parameter value determiner 150 in the lesion detection process.

Specifically, the more clearly a contour distinguishes the inside of a lesion region from the outside thereof in a medical image, a value of an energy function becomes closer to 0. Thus, the lesion detector 170 makes modification to an initial contour to determine the contour where an energy function has a value of or closest to a value of zero, 0, to detect the lesion.

The initial contour may be selected by a user or automatically selected by the computer.

Figure 2A:
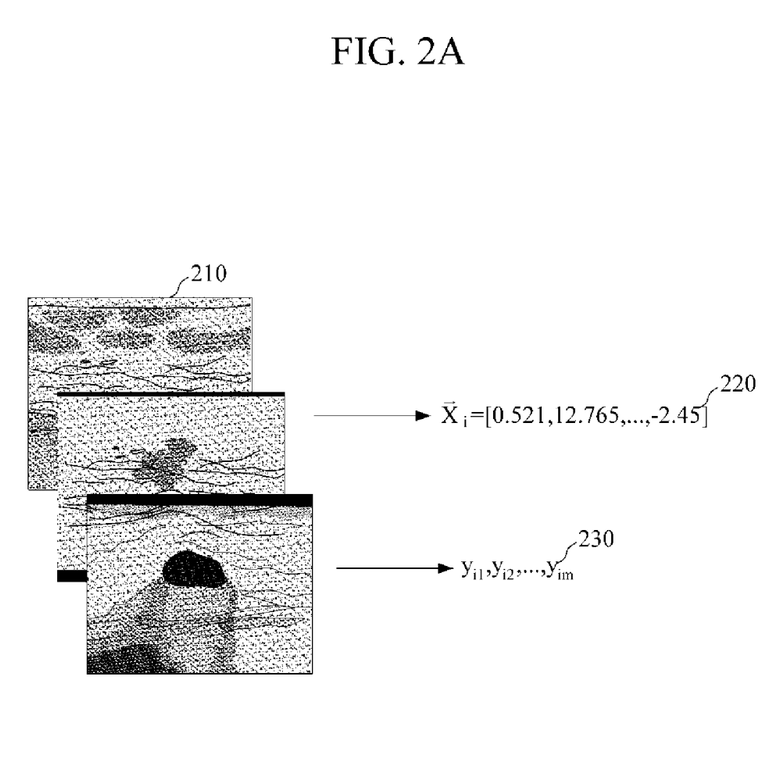
FIGS. 2A and 2B are examples of a parameter prediction model, according to an embodiment.
Figure 2B:
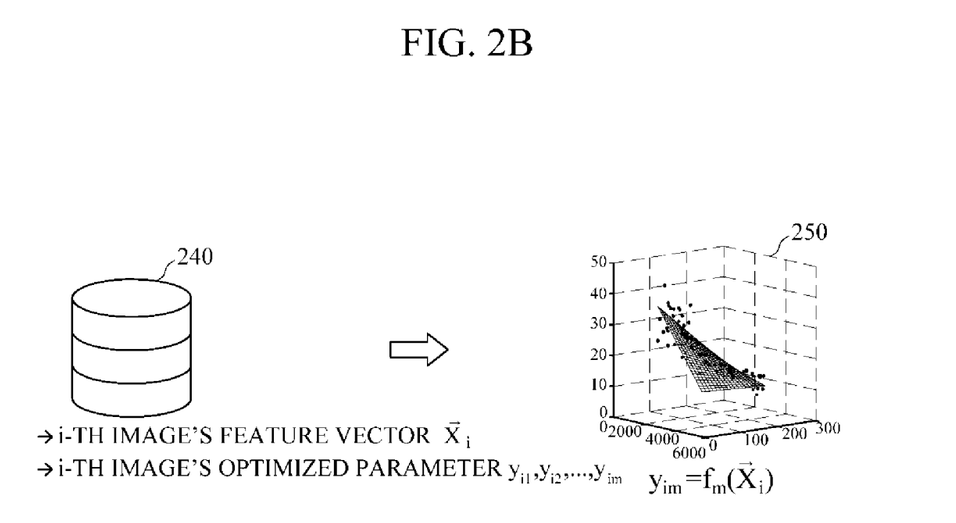

FIGS. 2A and 2B are diagrams illustrating examples of a parameter prediction model, in accordance with an embodiment.

Referring to FIG. 2A, a feature value 220 extracted from received pre-collected medical image 210 and a parameter value 230 optimized for the pre-collected medical images may be used as training data to generate a parameter prediction model.

In one example, the feature value 220 extracted from the pre-collected medical image is a numerical value indicating the pre-collected medical image's brightness, color, contrast, texture, a morphological characteristic of a specific region (e.g., a shape of a boundary, a diameter and a length), or correlation between the specific region and surrounding region thereof. In addition, the feature value includes at least one of a global feature value, a local feature value, and a meta feature value.

In one embodiment, the feature value extractor 130 extracts at least one of the global feature value, the local feature value, and the meta feature value from a pre-collected medical image.

Furthermore, the optimized value of parameter 230 may be a value of parameter of a lesion detection process, which is able to obtain the highest lesion detection accuracy from a pre-collected medical image.

In another embodiment, the optimized value of parameter 230 is a parameter that includes or boasts a higher accuracy in lesion diagnosis than any other value of parameters.

In addition, the optimized parameter value 230 used as training data may be a value heuristically obtained by a user or may be a value deducted using a process, such as a genetic process and a brute force process.

Referring to FIG. 2B, the parameter prediction model 250 is generated by applying training data 240, obtained from the pre-collected medical image, in a machine learning process, such as Support Vector Machine (SVM) and Expectation-Maximization, or by applying the training data 240 to one or more statistical methods, such as multi-variate linear/non-linear regression.

Figure 3:
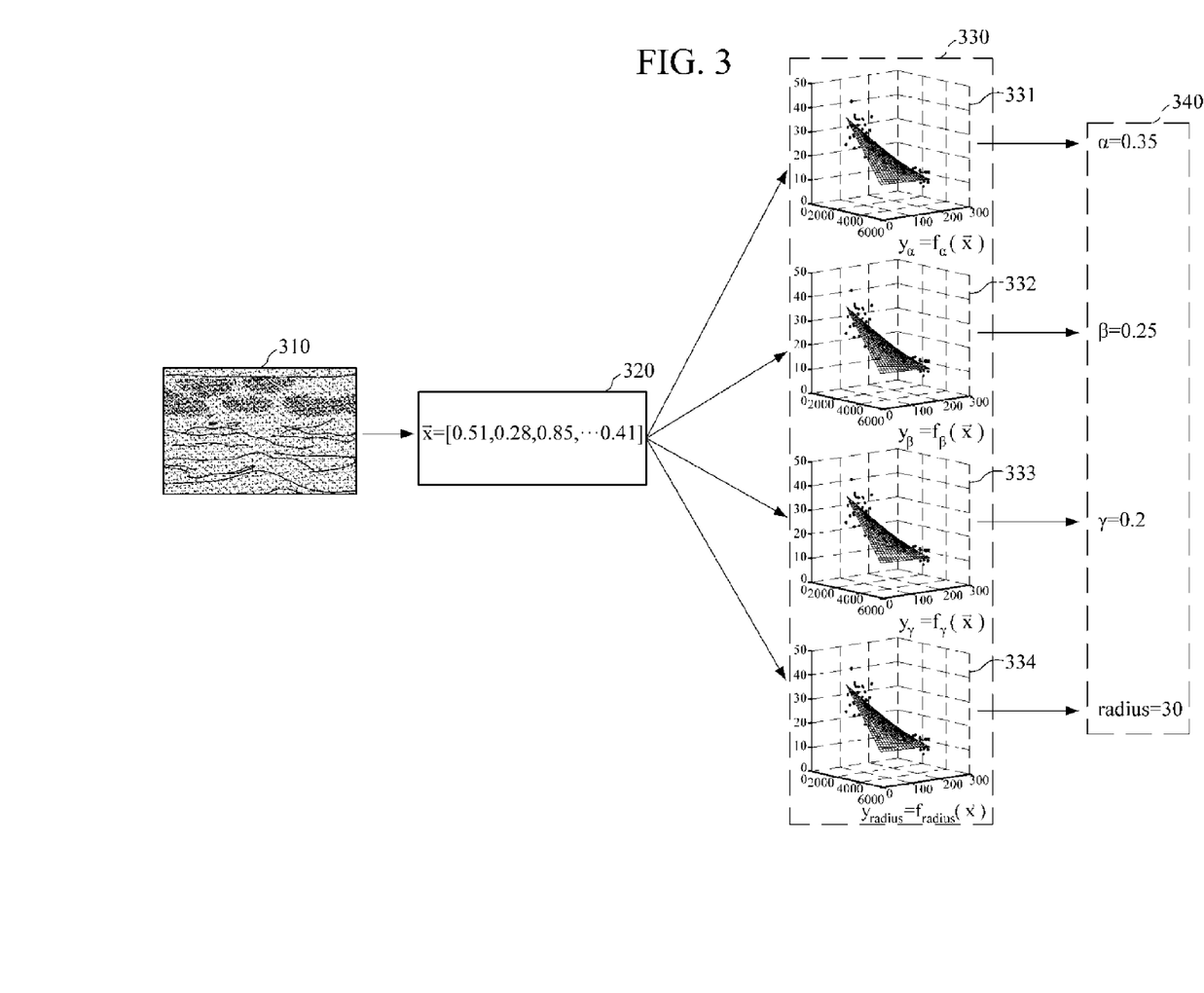
FIG. 3 is a diagram illustrating a procedure to determine a value of a parameter for a lesion detection process using a parameter prediction model, according to an embodiment.

FIG. 3 is a diagram illustrating a procedure on how to determine a value of parameter of a lesion detection process using a parameter prediction model.

Referring to FIG. 3, in response to receipt of a medical image 310 to be diagnosed, features 320 may be extracted from the received medical image 310.

Each of the features 320 may be a numerical value indicating the medical image's brightness, color, contrast, texture, a morphological characteristic of a specific region (e.g., a shape of a boundary, a diameter and a length), or correlation between the specific region and surrounding region thereof.

In addition, the specific region may be manually selected by a user or may be an automatically selected initial lesion region.

If a lesion detection process has multiple parameters 340, that is, parameters $\alpha$, radius, $\beta$ and $\gamma$, parameter prediction models 331, 332, 333 and 334 may be generated for the respective parameters 340.

For example, the parameter prediction model 331 for the parameter $\alpha$ is generated using the feature values extracted from a pre-collected medical images and a value of the parameter $\alpha$, which enables to deduct an optimized result from the pre-collected medical image, as training data. In this example, all the features extracted from the pre-collected medical image may be used as training data. In one example, among all the extracted feature values, only features values possibly affecting a value of $\alpha$ may be selectively used as training data.

For example, in the event that features possibly affecting a value of the parameter $\alpha$ are brightness, contrast and color of the medical image, feature values representing brightness, contrast, and color of the medical image are used as training data to generate the parameter prediction model 331 for parameter $\alpha$.

Similarly, the parameter prediction models 332, 333 and 334 may be generated using all the features extracted from the pre-collected medical image as training data or using some of the collected feature values that possibly affect each parameter as training data.

Further, a value of each parameter 340 regarding the received medical image 310 is extracted by applying the extracted feature values 320 in the respective parameter prediction model 331, 332, 333 and 334.

Specifically, each value of parameters $\alpha$, radius, $\beta$ and $\gamma$ 340 may be extracted by applying the feature values extracted from the medical image 310 in each of the parameter prediction models 331, 332, 333 and 334 for the parameters $\alpha$, radius, $\beta$ and $\gamma$, respectively.

In FIG. 3, all the feature values 320 extracted from the medical image 310 are applied in each of the parameter prediction model 331, 332, 333 and 334, but it is merely an example. Instead, a different extracted feature 320 may be applied in each of the parameter prediction models 331, 332, 333 and 334.

For example, when the parameter prediction model 331 for the parameter $\alpha$ is generated by using feature values representing brightness, contrast, and colors of the medical image as training data, only the feature values representing brightness, contrast, and color of the medical image are applied in the parameter prediction model 331 for parameter $\alpha$.

In the case where it is possible to obtain a plurality of values of parameters using one prediction model, unlike what is shown in FIG. 3, only one prediction model may be generated for a plurality of values of parameters.

For example, in the case where it is possible to obtain values of the parameters $\alpha$ and $\beta$ using one prediction model and to obtain values of the parameters radius and $\gamma$ using another prediction model, two parameter prediction model may be generated. In addition, in the case where it is possible to obtain all the values of the parameters $\alpha$, radius, $\beta$, and $\gamma$ using one prediction model, only one parameter prediction model is generated.

That is, one or more parameter prediction models may be used when multiple parameters are used for a lesion detection process.

Figure 4:
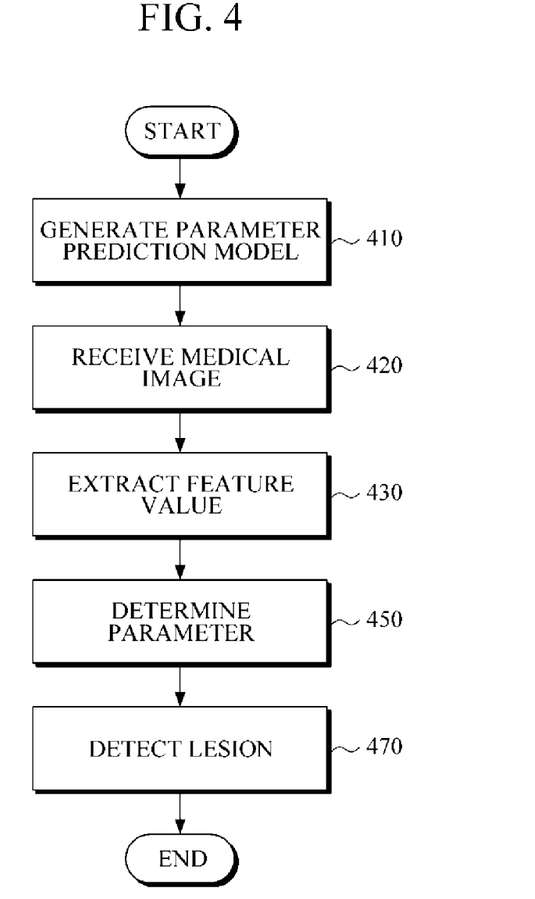
FIG. 4 is a flowing chart illustrating a method to detect a lesion, according to an embodiment.

FIG. 4 is a flow chart illustrating a method to detect a lesion, according to an embodiment.

Referring to FIG. 4, in the method to detect the lesion, at operation 410, the method generates a parameter prediction model by extracting feature values from a pre-collected medical image.

Specifically, the method generates the parameter prediction model using feature values extracted from a pre-collected medical image and an optimized value of a parameter for the pre-collected medical image as training data.

In one embodiment, when a lesion detection process has multiple parameters, one or more parameter prediction models may be generated.

At operation 420, the method receives a medical image to be diagnosed. At operation 430, the method extracts feature values from the received medical image.

The received medical image may be a Positron Emission Tomography (PET) image, a mammogram image, a Computed Radiography (CT) image, an ultrasound image, a Magnetic Resonance Image (MRI) image, and any other medical image that may be used for lesion diagnosis.

Further, a feature value indicates a numerical value indicating the medical image's brightness, color, contrast, texture, a morphological characteristic of a specific region (e.g., a boundary shape, a diameter and a length) or correlation between the specific region and surrounding region thereof.

In addition, the feature value extracted from the medical image may include at least one of a global feature value, a local feature value, and a meta feature value.

Herein, the global feature value reflects the entire region of the medical image.

In addition, the local feature value reflects a specific region within the medical image, and the meta feature value is a value that takes into consideration correlation between the global feature value and the local feature value.

Also, the specific region indicates an appropriate location of a lesion or an anatomically/pathologically significant marker, and may be selected by a user or automatically selected by a computer. For example, the specific region may be an initial lesion region selected by a user from a received medical image.

At operation 430, in response to extracting a feature value of the received medical image, the method, at operation 450, determines a value of parameter of a lesion detection process using the extracted feature value.

The lesion detection process defines a contour feature of a lesion region in a medical image as an energy function. For instance, the lesion detection process is used to find out a contour, of which an energy function has a minimal value, to detect a lesion. In addition, the lesion detection process may be any process that employs an energy function, such as a level set method and an active contour model.

In one embodiment, a value of parameter of the lesion detection process is determined using a feature extracted from a received medical image and a previously generated parameter prediction model.

After determines at operation 450 the value of parameter of the lesion detection process, at operation 470, the method detects a lesion in the received medical image using the lesion detection process applied with the determined value of the parameter.

For example, the method detects the lesion by making a modification to an initial contour of the received medical image to find out a contour of which an energy function leads to a solution of 0 or close to 0.

Here, the initial contour may be selected by a user or automatically selected by a computer.

In the case that the lesion is detected in the medical image, a value of a parameter for a lesion detection process may be determined by taking into consideration of features of the medical image, improving accuracy in lesion detection compared with a case of using a fixed value of a parameter.

In addition, in accordance with the various examples described above, the enhanced accuracy in lesion detection may lead to a more accurate diagnosis of a detected lesion.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like.

It is to be understood that in the embodiment of the present invention, the operations in FIG. 4 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIG. 4.

Program instructions to perform a method described in FIG. 4, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to detect a lesion, comprising a processor that comprises:
   a model generator configured to generate a parameter prediction model based on pre-collected medical images;
   an extractor configured to extract a feature value from a received medical image; and a determiner configured to determine a parameter value of a lesion detection process using the extracted feature value and the parameter prediction model.

2. The apparatus of claim 1, wherein the extractor is further configured to extract at least one of a global feature value, a local feature value, and a meta feature value.

3. The apparatus of claim 1, wherein the model generator is further configured to generate the parameter prediction model using, as training data, a feature value extracted from each of the pre-collected medical images and a parameter value optimized for each of the pre-collected medical images.

4. The apparatus of claim 1, wherein the lesion detection process employs an energy function.

5. The apparatus of claim 1, wherein the lesion detection process is a level set process.

6. The apparatus of claim 1, further comprising:
a detector configured to detect a lesion from the received medical image using the lesion detection process applied with the determined parameter value.

7. The apparatus of claim 1, wherein, in response to a plurality of parameters of the lesion detection process, the model generator is further configured to generate a parameter prediction model.

8. A method for detecting a lesion, comprising:
generating, at a generator using a processor, a parameter prediction model from pre-collected medical images;
extracting, at an extractor using the processor, a feature value from a received medical image; and
determining, at a determiner using the processor, parameter values of a lesion detection process using the extracted feature value and the parameter prediction model.

9. The method of claim 8, wherein the extracting of the feature value comprises extracting at least one of a global feature value, a local feature value, and a meta feature value.

10. The method of claim 8, wherein the generating of the parameter prediction model comprises generating the parameter prediction model using training data comprising a feature value extracted from each of the pre-collected medical images and a parameter value optimized for each of the pre-collected medical images.

11. The method of claim 8, wherein the lesion detection process employs an energy function.

12. The method of claim 8, wherein the lesion detection process is a level set process.

13. The method of claim 8, further comprising:
detecting a lesion in the received medical image using the lesion detection process applied with the determined parameter value.

14. The method of claim 8, wherein the generating of the parameter prediction model comprises, in response to parameters of the lesion detection process, generating a parameter prediction model.

15. An apparatus, comprising a processor that comprises:
a feature value extractor configured to extract a feature value from a medical image;
a model generator configured to generate a parameter prediction model using pre-collected medical images;
a parameter value determiner configured to determine a parameter value by defining a contour of a lesion region in the medical image as an energy function, and detecting a lesion by finding out the contour where the energy function has a minimum value using the feature value and the parameter prediction model; and
a lesion detector configured to detect a lesion in the medical image using the parameter value.

16. The apparatus of claim 15, wherein the feature value extractor extracts at least one of a global feature value, a local feature value, and a meta feature value with respect to a medical image.

17. The apparatus of claim 16, wherein the global feature value comprises a feature value reflecting an entire region of the medical image, the local feature value comprises a feature value reflecting a specific region of the medical image, and the meta feature value comprises a feature value in which the global feature value and the local feature value are combined.

18. The apparatus of claim 15, wherein the model generator is configured to generate the parameter prediction model using training data that comprises a feature value extracted for pre-collected medical images and a parameter value optimized for each of the pre-collected medical images.

19. The apparatus of claim 15, wherein the lesion detector defines the contour of the medical image where the energy function has a value of or is closest to zero.

20. The apparatus of claim 15, further comprising:
a medical image receiver configured to receive the medical image.

* * * * *